(12) United States Patent
Faes et al.

(10) Patent No.: US 8,054,164 B2
(45) Date of Patent: Nov. 8, 2011

(54) SENDING DEVICE TO PROPAGATE INFORMATION SIGNALS AND METHOD APPLIED THEREBY

(75) Inventors: Koenraad Karl Celest Faes, Antwerpen (BE); Paul Frans Marta Mortelmans, Sint-Katelijne-Waver (BE)

(73) Assignee: Option NV, Leuven (BE)

( * ) Notice: Subject to any disclaimer, the term of this patent is extended or adjusted under 35 U.S.C. 154(b) by 403 days.

(21) Appl. No.: 12/302,834

(22) PCT Filed: May 29, 2006

(86) PCT No.: PCT/BE2006/000062
§ 371 (c)(1),
(2), (4) Date: Nov. 28, 2008

(87) PCT Pub. No.: WO2007/137371
PCT Pub. Date: Dec. 6, 2007

(65) Prior Publication Data
US 2009/0184807 A1   Jul. 23, 2009

(51) Int. Cl.
*G08B 9/00* (2006.01)

(52) U.S. Cl. ........... 340/286.02; 340/539.1; 340/539.11; 340/539.25; 340/506

(58) Field of Classification Search ............... 340/286.2, 340/426.18, 426.2, 539.1, 539.11, 539.13, 340/539.22, 539.25, 506, 531
See application file for complete search history.

(56) References Cited

U.S. PATENT DOCUMENTS

| | | | |
|---|---|---|---|
| 5,400,246 A * | 3/1995 | Wilson et al. | 700/17 |
| 5,917,405 A * | 6/1999 | Joao | 340/426.17 |
| 6,400,265 B1 | 6/2002 | Saylor et al. | |
| 6,975,220 B1 * | 12/2005 | Foodman et al. | 340/531 |
| 7,205,891 B1 * | 4/2007 | McGlothlin et al. | 340/539.26 |
| 7,209,035 B2 * | 4/2007 | Tabankin et al. | 340/539.11 |
| 7,277,010 B2 * | 10/2007 | Joao | 340/539.25 |
| 2002/0026512 A1 | 2/2002 | Nishimura et al. | |
| 2006/0105794 A1 | 5/2006 | Carlson et al. | |

* cited by examiner

*Primary Examiner* — Daryl Pope
(74) *Attorney, Agent, or Firm* — Bacon & Thomas, PLLC

(57) ABSTRACT

Transmitter for distributing data signals, characterised in that it is provided with receiving means for collecting one or several data signals, a control unit (5) and a transmitting unit (3) connected thereto for transmitting an above-mentioned data signal via a network to one or several addressable receivers (6) from a series of pre-selected users, after the above-mentioned control unit (5) has received a starting signal to this end.

22 Claims, 1 Drawing Sheet

SENDING DEVICE TO PROPAGATE INFORMATION SIGNALS AND METHOD APPLIED THEREBY

FIELD OF THE INVENTION

The present invention concerns a transmitter for distributing data signals.

BACKGROUND

In particular, the present invention concerns a transmitter for distributing data signals, whereby this transmitter is provided with receiving means for collecting one or several data signals, a control unit and a transmitting unit connected thereto for transmitting an above-mentioned data signal via a network to one or several addressable receivers from a series of pre-selected users, after the above-mentioned control unit has received a starting signal to that end.

An advantage of such a transmitter according to the invention is that it makes it possible to directly transmit a data signal to one or several pre-determined, either or not mobile receivers of users when a certain event either or not occurs.

SUMMARY

Another advantage is that the access to the data signal is restricted to a group of users, pre-selected by the owner of the transmitter, either or not having a private character.

A transmitter according to the invention has numerous possible applications, such as, for example, distributing a video signal to one or several subscribers, either or not for commercial purposes, for example to directly broadcast images from a restaurant, a discotheque or the like.

Other possible applications are, for example, one or several pre-selected users who can watch direct images after certain detection means have transmitted a starting signal to the above-mentioned transmitter to that end.

Thus, for example, the transmitter can be provided with a built-in camera and it can be set up at a certain location, whereby a movement can be detected by means of a proximity switch, as a result of which a starting signal is sent to the transmitter, after which this transmitter starts to emit a video signal to one or several receivers, such that the situation at the above-mentioned location can be directly observed from a distance via the receiver.

Further applications consist, for example, in that certain games of chance, such as lottery draws, horse races or the like can be followed directly by subscribers who have put their names down to that end.

Another possible application of a transmitter according to the invention consists in that a user can send a starting signal to the transmitter via a portable and addressable receiver, after which this user receives a data signal from said transmitter and can follow directly what is going on for example in his private house or in a company at that time, for example as he receives direct audio signals and/or other data signals having to do with safety, general condition, persons being present, activity and the like.

The invention also concerns a method for distributing data signals by means of a transmitter according to the invention, whereby these data signals are distributed via a network from a transmitter at a certain location to one or several addressable receivers from a series of pre-selected users, whereby this transmitter receives, processes and transmits the data signals, and whereby the distribution of the data signals to each of the above-mentioned users as separate or in common is started as soon as the transmitter has received a starting signal to that end.

BRIEF DESCRIPTION OF THE DRAWINGS

In order to better explain the characteristics of the present invention, the following preferred embodiments of a transmitter according to the invention are given as an example only, with reference to the accompanying drawings, in which.

DETAILED DESCRIPTION OF VARIOUS EMBODIMENTS

Figure 1:
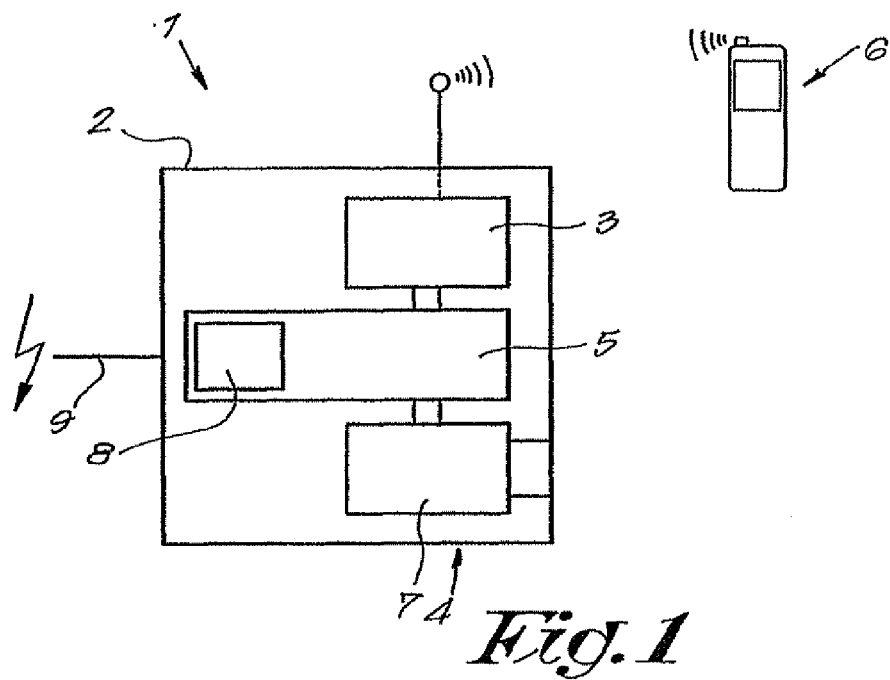
FIG. 1 schematically represents a transmitter according to the invention.

FIG. 1 represents a transmitter 1 for distributing a data signal from a certain location, which transmitter 1 in this case consists of a housing 2 in which are provided a transmitting unit 3, receiving means 4 and a control unit 5.

The above-mentioned transmitting unit 3 is in this case schematically represented as an antenna and, according to the invention, it can transmit data signals to an addressable receiver 6 via one or several of the following communication networks: a land line, WiFi, WiMAX, UMTS, EDGE, GPRS, DVB-H, MediaFLO® or the like.

By the term "land line" is meant here every communication network whose communication does not go via air and for which, consequently, a physical connection is provided, such as for example coax cables, glass fibres, copper wires or the like.

The above-mentioned addressable receiver 6 is in this case schematically represented as a mobile phone, but it is clear that the invention is not restricted as such and that such an addressable receiver 6 can also be realised by other types of devices, such as a PDA, a laptop or the like.

According to the invention, however, the receiver 6 may also consist of a device which can only communicate via a land line, such as for example a PC or the like.

The above-mentioned receiving means 4 in this case comprise a camera 7 which is built-in in the housing 2 of the transmitter 1, which in this case is a video camera, but which may be any other camera whatsoever, such as for example a webcam, a digital camera, a CCD camera or the like.

The control unit 5 which is in this case, but not necessarily, provided with a memory chip 8, is connected to the above-mentioned receiving means 4 and to the above-mentioned transmitting unit 3.

Further, the transmitter 1 comprises a power supply 9 which may consist of a connection to the electricity network, a battery or the like.

The transmitter 1 preferably comprises one or several activation means, which are not represented in the figure, which can communicate with the above-mentioned control unit 5 and which may comprise for example a decoder and, optionally, a signal generator.

According to a preferred characteristic of the invention, the above-mentioned transmitter 1 consists of what is called a "plug and play" device which works entirely autonomously and which initializes itself automatically when being connected to the power supply 9.

The working of a transmitter 1 according to the invention for distributing a data signal is very simple and as follows.

Before taking a transmitter 1 according to the invention into use, a user may transmit a signal, for example in the form of an SMS or the like, to said transmitter 1, for example by means of the addressable receiver 6, via a communication network, as a result of which the identification data of this user are stored in the memory 8 of the above-mentioned control unit 5, and the transmitter 1 is ready for use.

When the above-mentioned user then wishes to receive direct images from the above-mentioned camera 7 in his receivers 6, a starting signal has to be sent to the control unit 5 of the transmitter 1.

According to a preferred method, a code is emitted to this end by the user, coming from the receiver 6 of this user, such as for example in the form of an e-mail, SMS, MMS, WAP-push or the like, and which is used by the above-mentioned decoder to initialize the above-mentioned starting signal.

As a reaction to the above-mentioned starting signal, the control unit makes sure that a data signal, which in this case consists of a video signal which is generated by the above-mentioned camera 7, is transmitted to said user via the transmitting unit 3 and via a communication network.

According to a preferred characteristic of the invention, the above-mentioned control unit 5 comprises an algorithm which decides via which of the available communication networks the data signal will be transmitted.

A certain sequence can hereby be run through, for example, whereby it is successively tried to establish a communication with a receiver 6 via different communication networks, until the most appropriate communication network is found, for example as a function of a criterion, such as the fastest connection, the cheapest connection, the safest connection or the like, which can be inputted by the user of the device.

Another preferred characteristic of the invention consists in that the transmitting unit 3 is provided with an algorithm which adjusts the data signal, coming from the receiving means 4, depending on the protocol of the communication network concerned over which said data signal will be transmitted.

In the given example, the video signal must be adjusted, for example, when there is a switch between two communication networks having different band widths.

If necessary, the identification data of pre-selected users of an addressable receiver 6 can be stored in the transmitter 1, and in particular in the above-mentioned memory 8, which users are given the possibility to receive data signals from the above-mentioned transmitter 1, provided an appropriate code is sent to the transmitter 1 to this end if required.

According to the invention, it is also possible to connect the transmitter to a network server which controls the network connection between the transmitter 1 and the receivers 6.

In that case, the data of the different users can be controlled by said network server, so that no memory needs to be provided in the transmitter 1 to that end.

Preferably, but not necessarily, the transmitter 1 is equipped with a security device against unauthorised access, which security device is realised as a means for creating a dynamic IP address when establishing a connection between the transmitter 1 and a receiver 6, whereby this IP address is only valid during the transmission of the data signal to said receiver 6.

It is clear that a method and a transmitter 1 according to the invention can be used for many different applications, such as for example for direct marketing purposes, for watching direct images from a restaurant, discotheque or the like.

Thus, the transmitter 1 can be set up in a restaurant or discotheque, for example, and on certain occasions, a notification or invitation can be sent to a specific target group of pre-selected users by the above-mentioned signal generator and via the transmitting unit 3.

Next, if they wish to do so, these users can start the above-mentioned emission by sending an appropriate code to the decoder of the transmitter 1 so as to observe the ongoing situation on the site of the transmitter 1 on line so to say via their addressable receiver 6, to then decide to either or not take part in the event in question.

According to a preferred characteristic of the invention, the above-mentioned transmitter 1 is provided with means for recording the time of transmission to a certain user, not represented in the figures, such that it becomes possible, depending on the time of transmission to each of the different users, to charge these users, whereby this service may be provided for example by a network server.

It is not excluded according to the invention that the above-mentioned data signal is not an absolute direct signal, but an almost direct signal which is emitted with a feedback of a few minutes at the most, whereby the data signal is continuously recorded in this case and the information of at least the last few minutes is stored on a data carrier.

This makes it possible for the user to also consult information of a few moments before the current situation.

According to a special characteristic of the invention, the control unit 5 can be provided with an algorithm for processing or adding information to the data signal which is transmitted to a user.

Such processing may consist for example of adding identification data of the transmitter 1 concerned to a data signal which is emitted by this transmitter 1, such that a user who has access to several transmitters according to the invention always knows which transmitter 1 emitted the data signal concerned.

Other examples of such processing are for example adding a logo or banner to a video signal, for example for advertising purposes, or making an image correction.

Naturally, the transmitting unit 3 must have the necessary local arithmetic capacity to process the data signal in such a manner, and the transmitting unit 3 must moreover have all the necessary software to control the operation of the transmitter 1.

A preferred characteristic of the invention consists in that the transmitter 1 is provided with an algorithm which makes it possible to automatically realise updates, for example while the transmitter 1 is communicating via a land line such as the internet.

This is advantageous in that such updates can be realised without the user necessarily knowing it or having to do anything.

However, it is also possible according to the invention for such updates to be realised by a helpdesk which can update the transmitter 1 after having received the user's permission.

Figure 2:
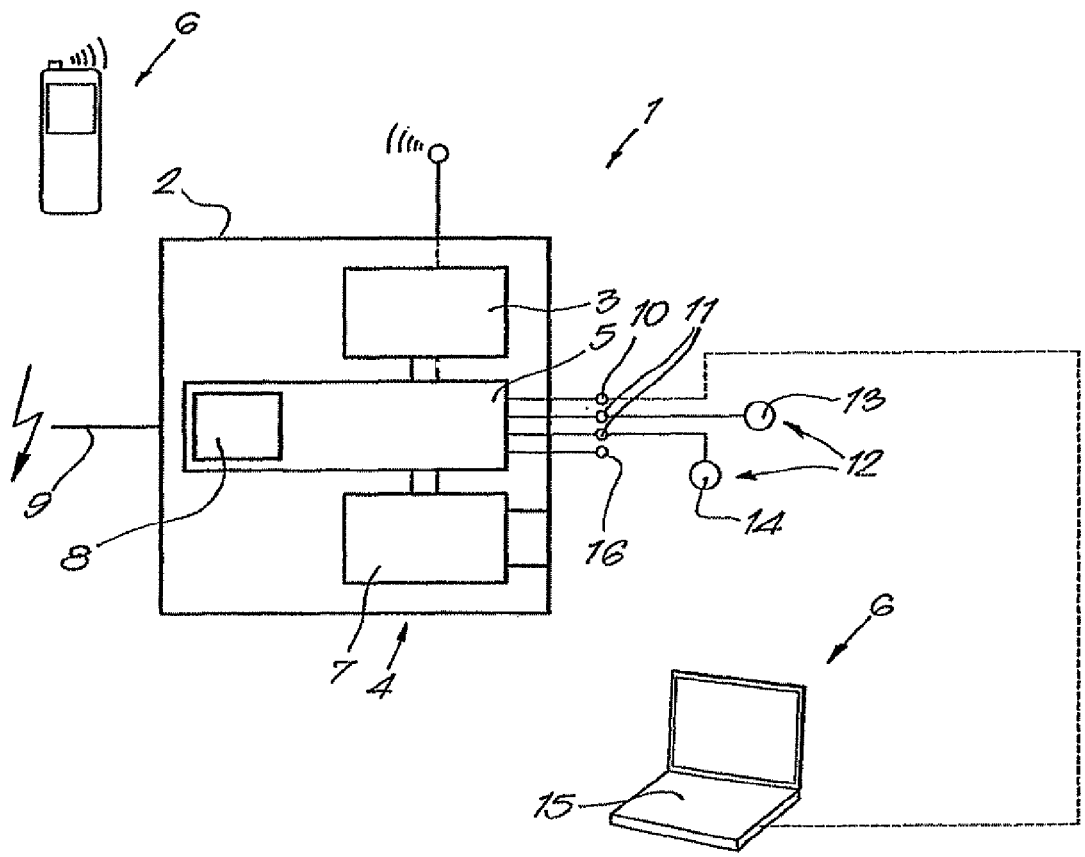
FIG. 2 represents a variant according to FIG. 1.

FIG. 2 represents a variant of a transmitter 1 according to the invention which is in this case provided with a connection 10 to connect to a land line, such as for example the internet, and which is also provided with an additional connection 11 for activation means 12 which in this case have the form of a motion detector 13.

It is clear that the above-mentioned activation means 12 are not restricted to a motion detector 13, but that they may be realised in the shape of all sorts of detection means, such as for example one or several of the following detectors and/or sensors: a smoke detector, a $CO_2$ detector, a temperature sensor, a sound detector, an infrared sensor, a proximity detector or a combination of such detectors.

As an alternative, it is not excluded to perform the detection via software, whereby the generation of a starting signal is initialized for example when there is a change in the image registered by a camera.

The above-mentioned activation means 12 have the shape of one or several switches 14 which can be activated by emitting a starting signal.

It is clear that the above-mentioned activation means 12 can also be part of the transmitter 1, such that this transmitter 1 must not necessarily be equipped with a connection 11 provided to that end.

According to a preferred characteristic of the invention, the above-mentioned receiving means 4 are provided with one or several connections for external devices for receiving data signals, such as sensors, cameras and the like.

The method for distributing a video signal with a transmitter 1 according to FIG. 2 is practically the same as described above.

In this case, the starting signal may be emitted by one or several of the above-mentioned activation means 12, such that a user can immediately receive direct data signals as soon as one or several of the above-mentioned detection means detect something and/or as soon as an above-mentioned switch 14 is activated.

In this case, the above-mentioned control unit 5 is made such that it can transmit the above-mentioned video signal via the internet.

An advantage of such an embodiment of transmitter 1 is that it can also transmit images to one or several receivers 6, for example in the form of a PC 15 which is connected to the internet and which is not equipped to receive data signals coming from a wireless communication network such as UMTS, GPRS or the like.

In this case as well, the video signals can be transmitted over a network server which controls the network connection between the transmitter 1 and the receivers 6 of the users.

It is not excluded according to the invention that the above-mentioned transmitter 1 is provided with connections 16 which are part of a domotica system, such as for example light switches, door locking systems and the like.

Such a transmitter 1 is advantageous in that it allows one or several users to activate said domotica system via the above-mentioned wireless network from a site situated at a distance.

In the given examples, the receiving means 4 are always equipped with a camera 1, but according to the invention, the presence of a camera 7 is not a requisite, and the receiving means 4 can also be sensors or the like.

The software of the transmitter 1 is preferably also provided to make it possible to input certain parameters and data of the pre-selected users via for example a separate keyboard or via for example a mobile phone which can communicate with the transmitter 1 via SMS messages so as to program settings via pre-programmed codes.

Such a parameter is for example a time interval, whereby a certain pre-selected user can only have access to the transmitter 1 during an adjustable time interval to receive the data signal.

The use of such parameters makes it possible, for example, to transmit a data signal to a pre-selected group of users when a certain event occurs.

Thus, for example, when the above-mentioned detection means comprise a smoke detector in a building, as soon as smoke is detected, a warning will be sent to pre-selected users by the transmitter 1, for example to the mobile phone of the occupants of the building, and to certain emergency services, in this case at least the fire brigade.

On the basis thereof, the warned persons and services can almost immediately assess the situation on the scene if they wish to do so, so that it can be established whether there is a false alarm or an immediate danger; moreover, the fire brigade can evaluate the situation in advance, which allows them to make the necessary preparations and bring in the appropriate means, so that no valuable time is lost between the moment the emergency services are called in and the time they arrive on the scene.

A major element thereby is that, in case of an actual fire, one can immediately assess whether there are any persons in danger.

The present invention is by no means restricted to the embodiments given as an example and represented in the accompanying drawings; on the contrary, such a method according to the invention for distributing a video signal and a transmitter applied thereby can be realised in many different ways while still remaining within the scope of the invention.

The invention claimed is:

1. Transmitter for distributing data signals, provided with a receiver arranged to collect one or several data signals, a control unit and a transmitting unit connected thereto for transmitting a data signal comprising said data signals via a network to one or several addressable receivers from a series of pre-selected users, after the control unit has received a starting signal, wherein the transmitter comprises
    a decoder arranged to initiate the starting signal on the basis of an appropriate code which is transmitted by a pre-selected user as an answer to a notification or invitation, and
    at least one activation device or connection therefore, which at least one activation device is arranged to send the starting signal to the control unit,
    wherein the at least one activation device comprises a signal generator arranged to send the notification or invitation to one or several of the pre-selected users via the transmitting unit.

2. Transmitter according to claim 1, wherein the at least one activation device comprises at least detection device and/or switches configured to transmit the starting signal or to activate the signal generator.

3. Transmitter according to claim 2, wherein the at least one detection device includes at least one or several of the following detectors and/or sensors:
    a smoke detector, a $CO_2$ alarm, a motion detector, a temperature sensor, a sound detector, an infrared sensor and a proximity switch.

4. Transmitter according to claim 1, including an arrangement enabling the determination of the length of the time of transmission to a certain user.

5. Transmitter according to claim 1, including a memory adapted to store the data of one or several of the users.

6. Transmitter according to claim 1, wherein the at least one receiving device comprises a built-in camera.

7. Transmitter according to claim 1, wherein the at least one receiving device includes one or several connections connectable to external devices for receiving data signals.

8. Transmitter according to claim 1, including one or several connections connectable to a domotica system which is controllable by the control unit.

9. Transmitter according to claim 1, configured as a "plug and play" device.

10. Transmitter according to claim 1, configured to operate entirely autonomously.

11. Transmitter according to claim 1, wherein the control unit includes an algorithm which, if several communication networks are available, will decide via which communication network the data signal is emitted.

12. Transmitter according to claim 1, wherein the transmitting unit includes an algorithm which adjusts the data signal as a function of the protocol of the communication network concerned over which said data signal is transmitted.

13. Transmitter according to claim 1, wherein the control unit is connected to one or several of the following communication networks: a land line, WiFi, WiMAX, UMTS, EDGE, GPRS, DVB-H and MediaFLO®.

14. Transmitter according to claim 1, wherein the control unit includes an algorithm for processing or adding information to the information flow.

15. Transmitter according to claim 1, including an algorithm for automatically realising updates.

16. Transmitter according to claim 1, including a security device against unauthorised access, said security device configured to create a dynamic IP address when establishing a connection between the transmitter and a receiver, such that the IP address is only valid while the data signal is being transmitted to said receiver.

17. Method for distributing data signals by means of a transmitter according to claim 1, wherein the data signals are distributed via a network from a transmitter at a certain location to one or several addressable receivers from a series of one or several pre-selected users, so that the transmitter receives, processes and transmits the data signals, and so that the distribution of the data signal to each of the users as separate or in common is started after the transmitter has received a starting signal to that end, wherein the starting signal comes from a decoder, via an activation device comprising a signal generator arranged to send a notification or invitation to one or several of the pre-selected users, and the decoder initiates the starting signal on the basis of an appropriate code which is emitted by a pre-selected user as an answer to the notification or invitation.

18. Method according to claim 17, wherein the data signal is a direct signal or is emitted with a feedback of a few minutes.

19. Method according to claim 17, wherein the transmission time to a certain user is recorded by means of the transmitter.

20. Method according to claim 17, wherein the data signal is a video signal coming from a camera which is part of receiving device of the transmitter.

21. Method according to claim 17, wherein the transmitter is controlled via a network server which controls the network connection between the transmitter and receivers of the users.

22. Method according to claim 17, wherein the data signal is transmitted to at least one of the above-mentioned users via one or several of the following communication networks: a land line, WiFi, WiMAX, UMTS, EDGE, GPRS, DVB-H and MediaFLO®.

* * * * *